United States Patent
Schmitz et al.

(10) Patent No.: US 8,925,947 B2
(45) Date of Patent: Jan. 6, 2015

(54) VEHICLE CHASSIS HAVING MODULAR REAR AXLE CONSTRUCTION

(75) Inventors: Kai Schmitz, Wermelskirchen (DE); Axel Grüneklee, Duisburg (DE); Burkhard Schulze-Bergkamen, Dortmund (DE); Michael Brenneis, Wadern-Dagstuhl (DE)

(73) Assignee: ThyssenKrupp Steel Europe AG, Duisburg (DE)

( * ) Notice: Subject to any disclaimer, the term of this patent is extended or adjusted under 35 U.S.C. 154(b) by 0 days.

(21) Appl. No.: 13/405,880

(22) Filed: Feb. 27, 2012

(65) Prior Publication Data

US 2012/0211962 A1 Aug. 23, 2012

Related U.S. Application Data

(63) Continuation of application No. PCT/EP2010/061508, filed on Aug. 6, 2010.

(30) Foreign Application Priority Data

Aug. 31, 2009 (DE) .......................... 10 2009 043 913

(51) Int. Cl.
B62D 21/11 (2006.01)

(52) U.S. Cl.
CPC ...................................... *B62D 21/11* (2013.01)
USPC .............................. 280/124.166; 280/124.109

(58) Field of Classification Search
USPC ..................................... 280/124.166, 124.109
See application file for complete search history.

(56) References Cited

U.S. PATENT DOCUMENTS

| | | | |
|---|---|---|---|
| 4,256,292 A * | 3/1981 | Sullivan et al. ................ | 267/220 |
| 4,941,677 A | 7/1990 | Matsumoto et al. | |
| 6,109,629 A * | 8/2000 | Bortz et al. ............ | 280/124.109 |
| 6,523,841 B2 | 2/2003 | Gläser et al. | |
| 6,755,429 B1 | 6/2004 | Buchwitz et al. | |
| 7,040,639 B2 | 5/2006 | Tamura | |
| 7,703,565 B2 * | 4/2010 | Ikenoya et al. ............ | 180/65.51 |
| 7,891,683 B2 * | 2/2011 | Bitz et al. ............... | 280/124.128 |
| 2004/0051292 A1 | 3/2004 | Tamura | |
| 2005/0140112 A1 * | 6/2005 | Kim ....................... | 280/124.143 |
| 2010/0032229 A1 | 2/2010 | Kim | |

FOREIGN PATENT DOCUMENTS

| | | |
|---|---|---|
| CN | 1623811 A | 6/2005 |
| CN | 1636774 A | 7/2005 |
| DE | 38 26 930 A1 | 3/1989 |

(Continued)

*Primary Examiner* — Keith Frisby
(74) *Attorney, Agent, or Firm* — Reinhart Boerner Van Deuren P.C.

(57) ABSTRACT

The invention relates to a bodywork of a motor vehicle comprising side members and a rear axle construction which is connected to the bodywork, the rear axle construction having means for attaching the rear axle construction to the bodywork and having a suspension, and the rear axle construction being configured as a torsion-beam axle or as a multi-link axle. The object to provide a generic bodywork of a motor vehicle with a rear axle construction which allows, in a financially favorable manner, a modular rear axle concept, i.e. the selective use of a torsion-beam axle or of a multi-link axle is achieved in that the bodywork has means for receiving the attachment means of a torsion-beam axle and of a multi-link axle and has means for receiving the attachment means and the suspension of a torsion-beam axle and of a multi-link axle.

9 Claims, 4 Drawing Sheets

(56) References Cited

FOREIGN PATENT DOCUMENTS

| DE | 19708421 A1 | 9/1998 |
| DE | 200 09 689 U1 | 11/2001 |
| DE | 10 2004 032 808 A1 | 1/2006 |
| DE | 10 2006 001 060 A1 | 1/2008 |
| DE | 10 2008 062 887 A1 | 2/2010 |
| WO | 2006/002991 A1 | 1/2006 |

* cited by examiner

VEHICLE CHASSIS HAVING MODULAR REAR AXLE CONSTRUCTION

CROSS-REFERENCE TO RELATED PATENT APPLICATIONS

This patent application is a continuation of PCT/EP2010/061508, filed Aug. 6, 2010, which claims priority to German Application No. 102009043913.7, filed Aug. 31, 2009, the entire teachings and disclosure of which are incorporated herein by reference thereto.

FIELD OF THE INVENTION

The invention relates to a bodywork of a motor vehicle comprising side members and a rear axle construction linked to the bodywork, the rear axle construction having means for attaching the rear axle construction to the bodywork and having a suspension, and the rear axle construction being configured as a torsion-beam axle or as a multi-link axle.

BACKGROUND OF THE INVENTION

Torsion-beam axles and multi-link axles are typical embodiments of rear axle constructions of a motor vehicle. These two constructions of rear axle meet different demands. The torsion-beam axle provides an economical wheel suspension which is predominantly used in the medium-size and small car domain. It has a small spatial requirement, a small mass associated with the wheel as well as advantageous transmission ratios between wheel and spring dampers. The wheel carriers are attached to bending-resistant and torsion-resistant trailing arms which are rigidly interconnected by a cross member. The cross member is configured to be simultaneously resistant to bending and torsionally flexible, thereby allowing a restricted, independent spring compression of both wheels. However, barring exceptions, torsion-beam axles are not suited to providing a simultaneous driving concept on the rear axle, since the cross member, but also the side members of the torsion-beam axle usually stand in the way of necessary drive shafts. To produce four wheel-drive vehicles, rear axle construction reverts back to multi-link axles which, on the one hand are able to realise relatively high comfort demands and on the other, provide adequate space for the drive between the rear wheels. In the multi-link axle, different suspension arms steer the toe and camber of the rear wheel during the wheel travel. Multi-link axles generally have a subframe which is constructed from cross members and side members and is screwed together with the bodywork of the vehicle. The connections of the torsion-beam axle and of the multi-link axle are usually different, so that for each type of axle, different rear end regions have to be produced for the bodywork of the vehicle. This means that the body in white has to be produced in a specific manner even before the installation of the rear axle construction, so that different rear end regions are provided in the bodywork for the different types of axle.

To remedy this problem, it is known, for example from German Patent Application DE 10 2004 032 808 A1 to fit a torsion-beam axle with a subframe which makes it possible to use connection points of a bodywork for a multi-link axle. In other words, an economical torsion-beam axle can be used, without modifications being made to the bodywork, instead of the multi-link axle provided for this bodywork. However, a problem of this proposed solution is that due to the subframe, this torsion-beam axle has a significantly greater weight and at the same time, the production costs of the torsion-beam axle increase significantly. This is a particular problem because torsion-beam axles are usually used in the more economical motor vehicles and are subject to a high cost pressure. If a specific bodywork is provided for each type of rear axle, the costs of providing a modular rear axle construction are also high.

On this basis, the object of the present invention is to provide a generic bodywork for a motor vehicle with a rear axle construction which allows, in a financially favourable manner, a modular rear axle concept, i.e. it allows the use of either a torsion-beam axle or a multi-link axle.

SUMMARY OF THE INVENTION

The invention relates to a bodywork of a motor vehicle comprising side members and a rear axle construction which is connected to the bodywork, the rear axle construction having means for attaching the rear axle construction to the bodywork and having a suspension, and the rear axle construction being configured as a torsion-beam axle or as a multi-link axle. The object to provide a generic bodywork of a motor vehicle with a rear axle construction which allows, in a financially favourable manner, a modular rear axle concept, i.e. the selective use of a torsion-beam axle or of a multi-link axle is achieved in that the bodywork has means for receiving the attachment means of a torsion-beam axle and of a multi-link axle and has means for receiving the attachment means and the suspension of a torsion-beam axle and of a multi-link axle, the suspension of the torsion-beam axle and of the multi-link axle being arranged such that identical means can be used in the bodywork for receiving the suspension of the torsion-beam axle and of the multi-link axle.

According to the teaching of the present invention, the indicated object for a generic bodywork of a motor vehicle is achieved in that the bodywork has means for receiving the attachment means of a torsion-beam axle and of a multi-link axle and has means for receiving the attachment means and the suspension of a torsion-beam axle and of a multi-link axle, the suspension of the torsion-beam axle and of a multi-link axle being arranged such that identical means for receiving the suspension of the torsion-beam axle and of a multi-link axle can be used in the bodywork.

It has been found that the provision of means for receiving the attachment means of a torsion-beam axle and of a multi-link axle in a single vehicle bodywork, together with the measure that the accommodation of the suspension of both types of axle is identical allows an economical modular construction of the rear axle. Thus, the vehicle bodywork can be used uniformly for the type of vehicle with a torsion-beam axle as well as, for example, for the four wheel-drive type of vehicle with a multi-link axle, without a significant increase in weight resulting for one of the two rear axle constructions. It is particularly advantageous that the body construction can be carried out in a non-specific manner, and high expenditure for a specific bodyshell work can be avoided. The decision whether a torsion-beam axle or a multi-link axle is assembled on the bodywork as an economical variant has to be made only upon installation of the rear axle construction. Therefore, as a result, the effort and costs involved in providing different axle concepts are significantly reduced.

According to a first configuration of the bodywork according to the invention, the bodywork has means for receiving the attachment means of the rear axle construction, which means can be used by the torsion-beam axle and by the multi-link axle. Due to the fact that a torsion-beam axle and a multi-link axle simultaneously use means for receiving the attachment means of the rear axle construction of the bodywork, the number of receiving means provided in the bodywork can be restricted, which contributes to saving costs.

For example, it is possible to dispense with additional receiving means on the bodywork for attaching shear plates which are provided to stabilise the subframe of a multi-link axle in that, according to a further configuration of the bodywork of the invention, the bodywork has means for receiving the attachment means of a torsion-beam axle which can be used for receiving attachment means of shear plates, provided to stabilise the subframe of a multi-link axle.

According to a next embodiment, a simplified attachment of the torsion-beam axle to the bodywork can be ensured in that the side members of the torsion-beam axle are connected to the bodywork by a vertical mounting. The corresponding receiving means of the bodywork are then also suitable, in a simple manner, for receiving the attachment means of the shear plates.

The bodywork preferably has at least one bracket attached to the rear side member of the bodywork to attach the multi-link axle. This bracket can consist of a plurality of attachments. Although it leads to a slightly increased weight of the bodywork when the torsion-beam axle is installed, this increase in weight is relatively small compared to the concept known from the prior art. Furthermore, the bracket provides, in a particularly simple manner, connection points for a multi-link axle, so that overall, the costs of this bodywork variant are particularly low due to the non-specific bodyshell work.

According to a further embodiment of the bodywork according to the invention, the suspension of the rear axle construction has at least two spring struts with an integrated damper element or has at least two spring elements with separate damper elements. The spring struts with an integrated damper element allow a space-saving construction of the rear axle, but are more cost intensive. The separate configuration of spring elements and separate damper element is overall more economical.

A next embodiment of the bodywork according to the invention provides a particularly simple accommodation of the suspension, in that spring strut receiving cups or spring damper receiving cups are provided in the side member of the bodywork to receive the suspension of the rear axle construction. The spring damper receiving cups preferably have a deep jump between the seat of the spring strut and of the damper leg in order to improve the stability of the damper receiving cup which consists of a deep-drawn half shell.

It has been found that it is advantageous to arrange the separate damper element offset with respect to the spring element in the direction of the front of the vehicle. This makes it possible in a particularly simple manner to jointly use the damper and spring element positions of the different rear axle constructions, i.e. of the torsion-beam axle and of the multi-link axle and to simultaneously achieve an effective rear axle kinetics. At the same time, with this arrangement of the damper and spring elements, it is possible to use identical receiving means of the vehicle bodywork in a particularly simple manner.

A particularly good rear axle kinematics can be achieved by arranging the damper element upstream of the axial centre of the respective rear wheel and/or by arranging the spring element downstream of the axial centre of the respective rear wheel.

At the same time, to simultaneously ensure comfort when the position of the spring and damper elements is changed, according to a next further configuration, it is advantageous for the torsion-beam rear axle and/or for the multi-link axle to have a sunken mounting for the damper elements. In particular, the sunken mounting of the damper elements ensures a maximum damper path to allow the most comfortable suspension possible. Improved possibilities are also created for the sunken mounting of the dampers when the damper element is arranged upstream of the axial centre. However, attention must be paid to the desired ground clearance for the vehicle.

BRIEF DESCRIPTION OF THE DRAWINGS

There are a large number of possibilities of configuring and developing the bodywork according to the invention. In this respect, reference is made to the claims following claim 1 and to the description of embodiments in conjunction with the drawings, in which:

DETAILED DESCRIPTION OF THE INVENTION

Figure 1:
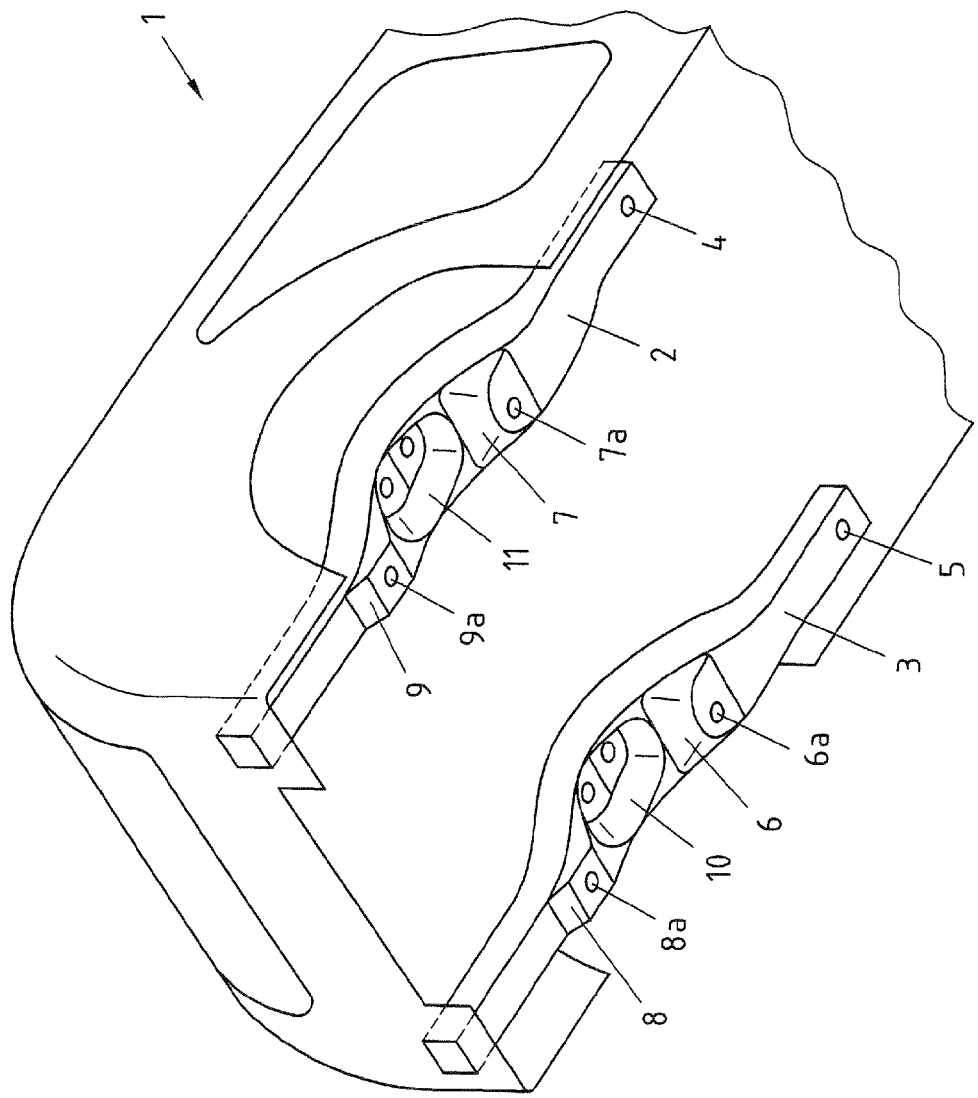
FIG. 1 is a perspective bottom view of a vehicle bodywork according to the invention without a rear axle construction.

FIG. 1 is a perspective view of an embodiment of a bodywork 1 according to the invention of a motor vehicle. Provided in the rear region of the vehicle bodywork 1 are side members 2, 3 which have means for receiving the attachment means of a torsion-beam axle and of a multi-link axle 4, 5, 6, 7, 8, 9. The means for receiving the attachment means of a torsion-beam axle and of a multi-link axle can be configured, for example, as in the illustrated embodiment, by screwing facilities 4, 5 in the side members 2, 3, which are used as connection points for the torsion-beam axle or as attachment points for shear plates.

Means for receiving the multi-link axle are provided in the form of a bracket 6, 7, 8 and 9 on the side members 2, 3. The multi-link axle, not shown in FIG. 1, uses the connection points 6a, 7a, 8a, 9a for the attachment of the subframe of the multi-link axle. Furthermore, the embodiment according to the invention of a vehicle bodywork 1 has receiving means for receiving the suspension of the torsion-beam and multi-link axles, which receiving means are made in the side member as spring-damper receiving cups 10, 11. There, they form a kind of stiffening plate, which produces a significant reinforcement of the side member 2, 3 in this region. The bracket 6, 7, 8, 9 of the vehicle bodywork 1 remains on the vehicle bodywork 1 even if a torsion-beam axle 12 is installed which does not require the connection points provided by the bracket.

The torsion-beam axle only uses the means 4, 5 for receiving the attachment means of the torsion-beam axle as well as the spring damper receiving cups 10, 11 for connection. However, the additional weight which is taken into account through the provision of the bracket in the vehicle bodywork 1 and the additional costs of the vehicle bodywork 1 due to the bracket which is provided are disproportionate to the reduction in cost due to the allowed, non-specific bodyshell work of the bodywork 1, which is simply achieved through the provision of the bracket 6, 7, 8, 9. "Non-specific" means that, up until the assembly of the rear axle construction 12, 22, the bodyshell work of the bodywork 1 does not have to be divided up into two methods, one for a bodywork 1 with a multi-link axle 22 and another for a bodywork 1 with a torsion-beam axle 12.

Figure 2:
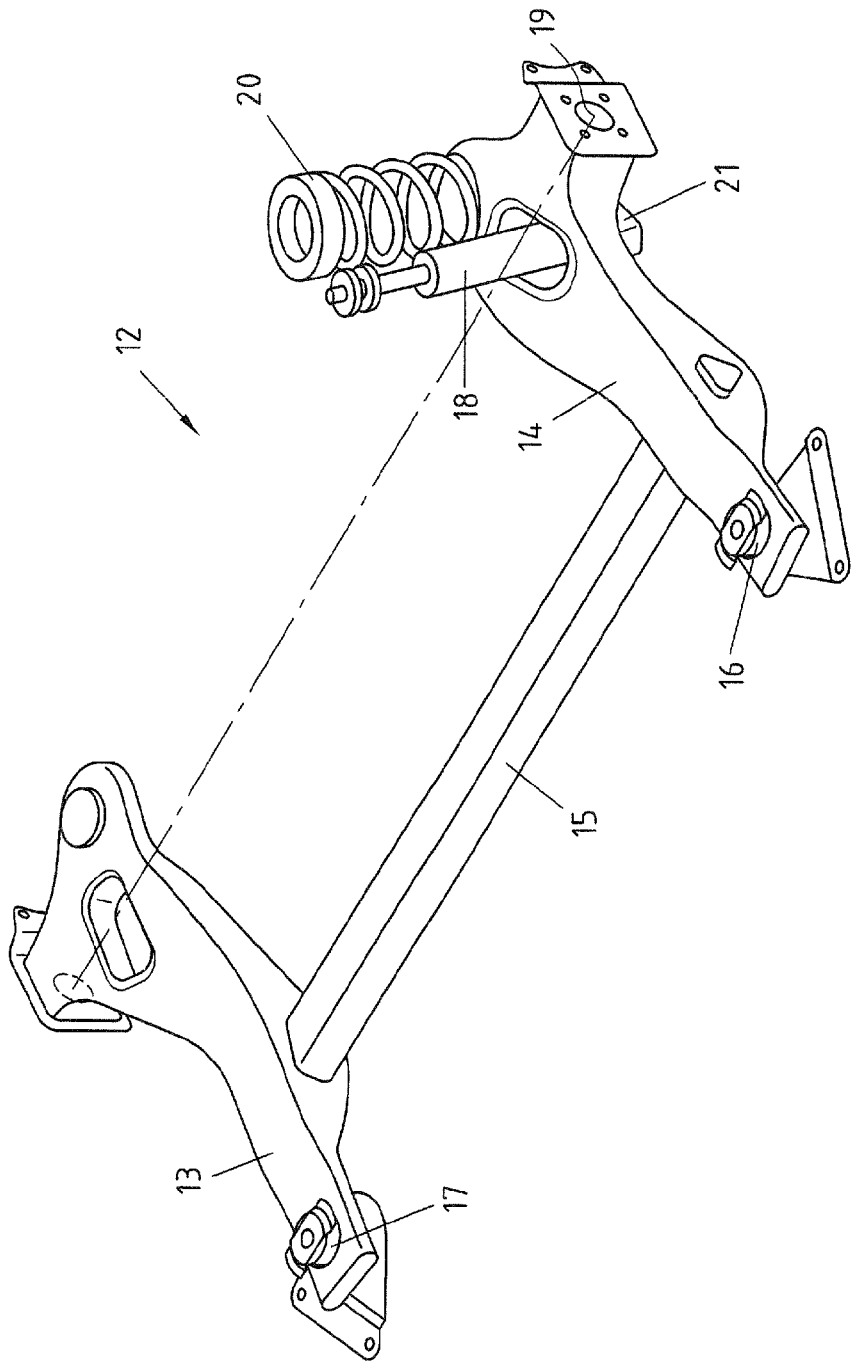
FIG. 2 is a perspective view of an associated rear axle construction as a torsion-beam axle.

FIG. 2 is a perspective view of a rear axle construction, adapted to the vehicle bodywork 1, as a torsion-beam axle 12.

The side members 13, 14 of the torsion-beam axle are interconnected by a cross member 15. The side members 13, 14 of the torsion-beam axle 12 are attached to the vehicle bodywork 1 or to the side members 2, 3 thereof by a vertical mounting 16, 17. As can be seen from the embodiment of the torsion-beam axle 12, the damper 18 is arranged upstream of the axial centre 19 of the respective rear wheel and the spring element 20 is arranged downstream of the axial centre. Together with the sunken mounting 21 of the damper element 18, a torsion-beam axle 12 is provided which is optimised in respect of the driving dynamics or rear axle kinematics. The sunken mounting of the damper element 18 also ensures an adequate damper path for increased comfort.

Figure 3:
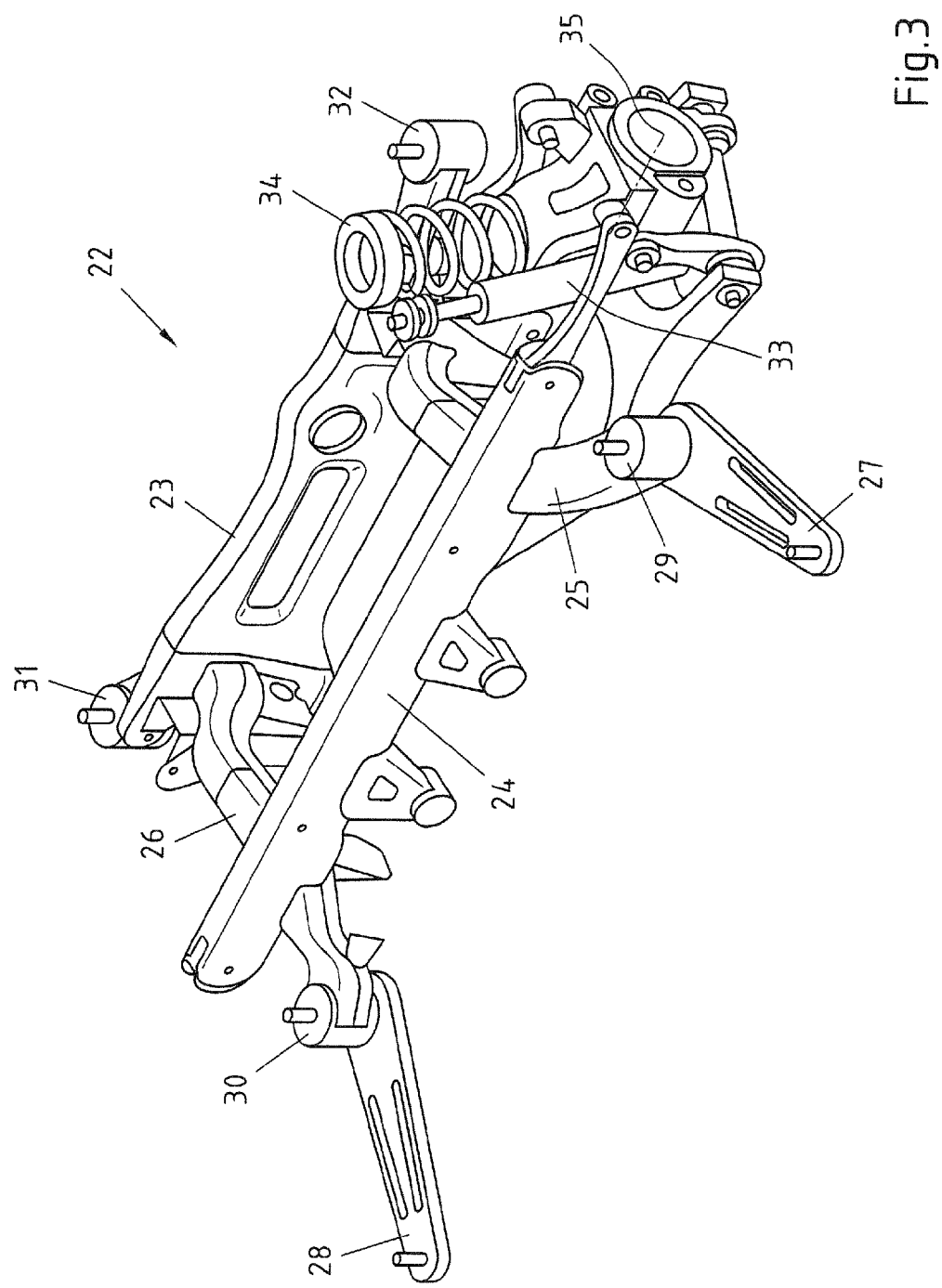
FIG. 3 is a perspective view of an associated rear axle construction as a multi-link axle.

FIG. 3 is a perspective view of a rear axle construction which is also adapted to the vehicle bodywork 1, in the form of a multi-link axle 22. The multi-link axle 22 consists of two cross members 23, 24 which are interconnected by two side members 25, 26 and form the subframe for the multi-link axle. The shear plates 27, 28 can be attached, for example to the side members 2, 3 in the vehicle bodywork 1 where, if a torsion-beam axle 12 is installed, said torsion-beam axle is mounted horizontally. The subframe, formed by the side members and cross members 23, 24, 25, 26 uses the connection points 6a, 7a, 8a and 9a of the vehicle bodywork 1 via the connection points 29, 30, 31, 32 thereof. The multi-link axle thus also uses receiving means which are provided for the torsion-beam axle 12 by the vehicle bodywork 1.

As shown in the present embodiment in FIG. 3, the damper element 33 is arranged upstream of the axial centre 35 of the rear wheel. Finally, the spring element 34 is arranged downstream of the axial centre 35, thereby producing an optimised rear axle kinematics. For connection to the vehicle bodywork 1, both spring and damper elements 33, 34 use the combined spring-damper receiving cups 10, 11 of the embodiment, illustrated in FIG. 1, of a vehicle bodywork 1. In FIGS. 2 and 3, for reasons of simplicity a pair of spring and damper elements is only shown on one side. Of course, a corresponding arrangement must also be provided on the opposite side. FIG. 3 also shows that the mounting of the damper element 33 is sunken relative to the mounting of the spring element 34, in order to keep the damper path at a suitable size.

Figure 4:
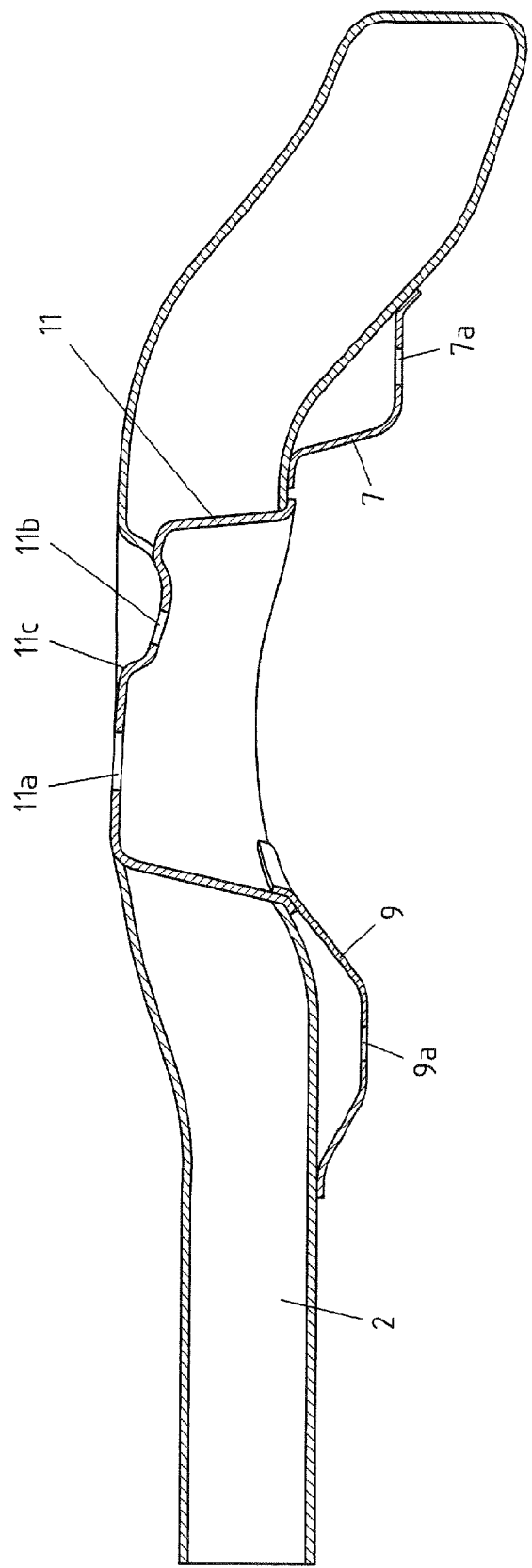
FIG. 4 is a schematic sectional view of the side member in the rear region of the vehicle bodywork according to FIG. 1.

FIG. 4 is a sectional view of the structure of the rear side member 2 of the vehicle bodywork from FIG. 1. This figure shows the side member 2 which is configured continuously from the centre to the rear end of the vehicle. Parts of the bracket 7, 9 for connecting the subframe of the multi-link axle are shown in FIG. 4. The receiving points 7a and 9a are used for attaching the bracket at points 30 and 31. The spring-damper receiving cup 11 made in the side member 2 has a region 11b which is provided for receiving the damper element 18, 33. The spring element 20, 34 of the torsion-beam axle 12 or of the multi-link axle 22 is received in region 11a of the spring-damper receiving cup 11. Provided between both regions is a step 11c which is used to reinforce the structure of the receiving cup 11. As can also be seen in FIG. 4, the spring-damper receiving cup 11 is made in the side member 2 in the manner of a stiffening plate so that a reinforcing effect is achieved in the side member 2 by the receiving cup 11.

The embodiment of the vehicle bodywork 1 according to the invention with the associated axle constructions 12, 22 shows that it is possible to produce a vehicle bodywork which, at a low expense, provides a modular rear axle construction, thereby making it possible to obtain a non-specific body in white. This lowers the costs of providing additional variants of drives and rear axle constructions for a motor vehicle.

The invention claimed is:

1. Bodywork of a motor vehicle comprising:
side members and a rear axle construction which is connected to the bodywork, the rear axle construction having means for attaching the rear axle construction to the bodywork and having a suspension, and the rear axle construction being configured as one of a torsion-beam axle or as a multi-link axle, wherein the bodywork has means for receiving the means for attaching and the suspension of a torsion-beam axle and of a multi-link axle, wherein the suspension of the torsion-beam axle and of the multi-link axle being arranged such that identical means can be used in the bodywork for receiving the suspension of the torsion-beam axle and of the multi-link axle, and wherein each side member includes a receiving cup including a top wall and a sidewall depending downwardly from the top wall, the top wall including a first and a second mounting surface, wherein the first and second mounting surfaces are non-coplanar and non-parallel, and wherein the first and second mounting surfaces are separated by a step.

2. Bodywork according to claim 1, wherein the bodywork has means for receiving the means for attaching of the rear axle construction, which means for receiving can be used by the torsion-beam axle and by the multi-link axle.

3. Bodywork according to claim 1, wherein the bodywork has means for receiving the means for attaching of the torsion-beam axle, which means can be used for receiving means for attaching of shear plates which are provided to stabilise the subframe of a multi-link axle.

4. Bodywork according to claim 1, wherein side members of the torsion-beam axle are connected to the bodywork by a vertical mounting.

5. Bodywork according to claim 1, wherein for attaching the multi-link axle, the bodywork has at least one bracket which is attached to the side member of the bodywork.

6. Bodywork according to claim 1, wherein the suspension of the rear axle construction has one of 1) at least two spring struts with an integrated damper element or 2) has at least two spring elements with separate damper elements.

7. Bodywork according to claim 6, wherein the separate damper element is in an offset arrangement with respect to the spring elements in the direction of the front of the vehicle.

8. Bodywork according to claim 7, wherein at least one of the damper elements is arranged upstream of an axial centre of a respective rear wheel and/or the spring element is arranged downstream of the axial centre of the respective rear wheel.

9. Bodywork according to claim 1, wherein the torsion-beam axle or the multi-link axle has sunken mountings for damper elements.

* * * * *